(12) United States Patent
Taylor et al.

(10) Patent No.: US 7,599,753 B2
(45) Date of Patent: Oct. 6, 2009

(54) SYSTEMS AND METHODS FOR RUNNING PRIORITY-BASED APPLICATION THREADS ON A REALTIME COMPONENT

(75) Inventors: Jeffrey Eames Taylor, Issaquah, WA (US); Joseph C. Ballantyne, Redmond, WA (US); Shanmugam Mohanraj, Kochi (IN)

(73) Assignee: Microsoft Corporation, Redmond, WA (US)

(*) Notice: Subject to any disclaimer, the term of this patent is extended or adjusted under 35 U.S.C. 154(b) by 1020 days.

(21) Appl. No.: 09/960,873

(22) Filed: Sep. 21, 2001

(65) Prior Publication Data

US 2002/0107594 A1   Aug. 8, 2002

(51) Int. Cl.
 *G06F 17/00* (2006.01)
 *H04B 1/00* (2006.01)
 *G06F 3/00* (2006.01)
 *G06F 5/00* (2006.01)

(52) U.S. Cl. .................... 700/94; 381/119; 710/56; 710/60

(58) Field of Classification Search ............ 700/94; 710/36–61; 711/209; 381/119
See application file for complete search history.

(56) References Cited

U.S. PATENT DOCUMENTS 3,938,096 A * 2/1976 Brown et al. ............... 711/209
5,113,510 A * 5/1992 Hillis ......................... 711/121
5,487,167 A * 1/1996 Dinallo et al. ............ 715/500.1
5,721,922 A * 2/1998 Dingwall .................... 718/103
5,768,126 A * 6/1998 Frederick ..................... 700/94
5,812,800 A * 9/1998 Gulick et al. ................ 710/306
5,887,134 A * 3/1999 Ebrahim ..................... 709/200
6,931,370 B1 * 8/2005 McDowell ................ 704/200.1

OTHER PUBLICATIONS

Bargen, Bradley and Peter Donnelly, "Inside DirectX", 1998, Microsoft Press, pp. 203-266.*

* cited by examiner

*Primary Examiner*—Curtis Kuntz
*Assistant Examiner*—Daniel R Sellers

(57) ABSTRACT

Systems and methods for processing data from priority-based operating system threads within a realtime component are described. The component submits blank buffers to hardware. The component receives data from priority based operating system threads and processes and writes the data from within an independent second real-time thread to buffers before the buffers into which the data is written are used by the hardware. Hardware buffers are created offset from memory page boundaries such that the least significant bits of any memory address referencing the start of the buffer uniquely identify it and can be used as an index into a circular buffer queue to determine which buffer is currently being processed. Data is always processed and written into a buffer that is a predetermined range of buffers in front of the buffer currently being processed by the hardware.

7 Claims, 4 Drawing Sheets

SYSTEMS AND METHODS FOR RUNNING PRIORITY-BASED APPLICATION THREADS ON A REALTIME COMPONENT

TECHNICAL FIELD

The present invention relates to running priority-based application threads on a realtime component. More particularly, the present invention relates to running priority-based audio component threads on a sound component based on a realtime schedule.

BACKGROUND

Most operating systems, including the WINDOWS family of operating systems by MICROSOFT, are priority-based models, meaning that the determination of which processes or threads get executed first are based on a level of importance—or priority—assigned to the processes or threads. For example, a thread dealing with spreadsheet calculation may be assigned a lower priority than a driver interrupt, because it is more important to process a driver interrupt (in the event, say, that a modem just received sixteen more characters) than it is to process the spreadsheet calculation. Part of the priority in this case is that other processes may depend on the fact that other processes depend on receiving the data from the modem.

One of the problems encountered with a priority-based system is that some processes may be preempted by a process having a higher priority. While this is not a problem in some cases, there are times when a pre-empted process may be pre-empted for longer than an acceptable amount of time. Streaming audio and video processes, for example, cannot be pre-empted for too long without experiencing unacceptable delays that result in glitches. Furthermore, if several applications are running that have threads that are assigned a high priority, the streaming media may be held off too long to execute properly.

Multimedia applications in particular have a goal of providing glitch-free operation so a user experiences a technically smooth operation. However, to obtain dependable glitch-free operation in a priority-based system, data must be submitted in large segments. Providing data in large segments causes a problem with high latency periods (the time from rendering the segment, or buffer, until the time the segment is played). High latency is undesirable for multimedia applications.

The high latency problem may be solved by submitting multimedia data in smaller segments. However, when this is done, the multimedia application is subject to interruption by higher priority threads. In a worst case scenario, several higher priority threads can be processed while the multimedia data is held off indefinitely.

A solution that many developers are turning to is to implement a realtime scheduling system, where each thread to be executed is allocated a certain percentage of guaranteed processor time for execution. Use of a realtime scheduler guarantees that a thread won't be delayed indefinitely or for too long to prevent unacceptable execution.

However, use of a realtime scheduling system presents another problem: even if components within an operating system are realtime-based, there are many applications, drivers, hardware, etc., that schedule threads on a priority basis. Therefore, the result is a component that schedules threads on a priority basis to a system component that schedules threads on a realtime basis. If threads are simply passed through to a realtime scheduler as they are received on a priority basis, the same limitations experienced with priority-bases systems will still be seen.

There is a need for a way to run priority-based components, or threads, on a realtime scheduler so that the priority-based component can experience the advantages of a realtime system.

SUMMARY

Systems and methods are described for running a priority-based component on a realtime scheduler. An operating system module (i.e., a WINDOWS kernel mode module) receives data from a user mode component that schedules threads on a priority basis. The systems and methods described herein may be described as a bridge between components running in normal threads and components running in realtime mode. As such, it applies to any system with boundaries between realtime and non-realtime components.

An audio mixer module provides an interface between an audio hardware driver and one or more priority-based applications. The audio mixer receives data from the applications that the applications submit to the audio hardware for playing. A priority-based operating system allows the applications to send the data as priority allows. The audio mixer then sends the data received from the applications to the audio hardware, via the driver, according to a realtime scheduler.

To accommodate both the priority-based system and the real-time system, the audio mixer is configured to submit a series of empty buffers. The empty buffers are submitted to the driver to be played by the audio hardware. The audio hardware plays buffers in a circular queue, so empty buffers that are submitted must wait some time before they are played. This reserves space in the realtime system for data from the applications to be played. Before the audio hardware attempts to play an empty buffer, the audio mixer fills the buffer with data received from the applications. This allows data received from the applications according to a priority to be played according to a realtime schedule.

In one implementation of the invention described herein, the audio mixer performs a customized mix loop that allows the audio mixer to determine when an empty buffer is just ahead of the audio hardware and mix into that buffer to provide a playable buffer that will be played when the audio hardware is ready. The mix loop may be individually tailored to mix a certain amount of buffers before the buffers are played by the audio hardware and to synchronize the mixing with the playing by the audio hardware. If the buffers are mixed at a faster or slower rate than the audio hardware is playing the buffers (because the audio hardware and the audio mixer are running off different clocks) then the mix loop compensates mixing so that the mixing and the playing remain in synchronization.

Since the implementations described herein require that the mixer know exactly what data (i.e., which buffer) is being played at any given time, a tracking mechanism is described that allows the mixer to be informed of an exact memory location that is being played. To accomplish this, the buffers are allocated to begin on a page boundary in memory. Each buffer is offset into the memory page by a factor of the buffers position in the queue. For example, buffer zero is not offset into the page; buffer one is offset sixteen bits into the page; buffer two is offset thirty-two bits into the page; and so on. This allocation allows the tracking mechanism to use the bottom eight (or more) bits in a virtual memory address (which indicate on offset into a memory page) as an index number of a buffer within the circular queue.

DETAILED DESCRIPTION

Exemplary System

Figure 1:
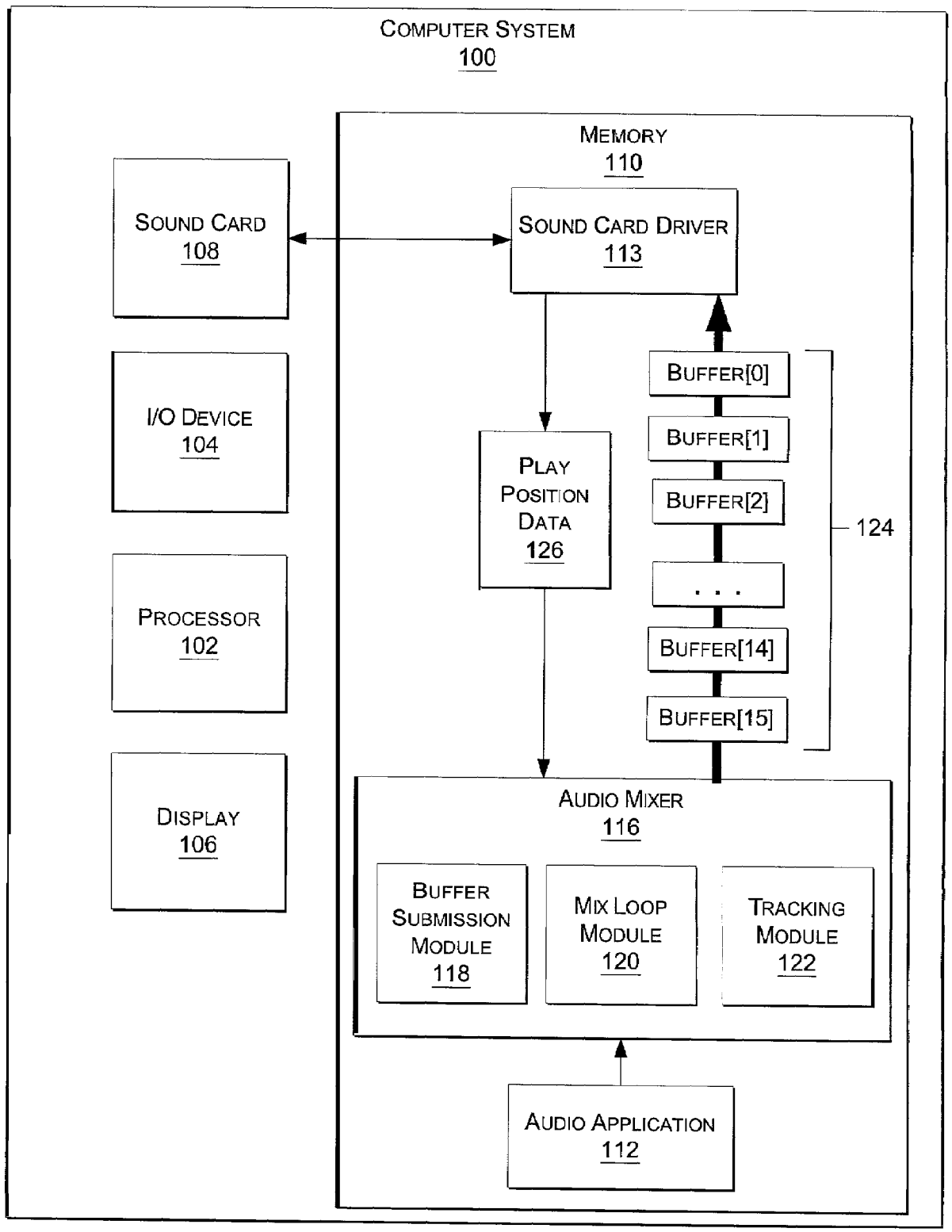
FIG. 1 is a block diagram of an exemplary computer system on which at least one embodiment of the invention may be implemented, indicating data flow between components.

FIG. 1 is a block diagram of a basic computer system 100 showing components involved in the present invention and showing data flow between the components. The computer system 100 includes a processor 102, an input/output (I/O) device 104 configured to receive and transmit video and/or audio data, a display 106, audio hardware 108 for playing audio data, and memory 110. The memory 110 stores an audio application 112, which is a non-realtime audio client playing audio data and an audio hardware driver 113 that is configured to drive the audio hardware 108.

The audio application 112 sends data to an audio mixer 116, which is configured to receive audio data from various sources and mix the audio data to provide a single output to the audio hardware 108 via the audio hardware driver 113. The audio mixer includes a buffer submission module 118, a mix loop module 120 and a tracking module 122. The functions of the audio mixer modules will be discussed in greater detail below.

The audio mixer 116 transmits the audio data to the audio hardware driver 113 in a series of buffers 124. There may be virtually any number of buffers 124 designed to hold virtually any amount of audio data; however, in the described implementation, there are sixteen buffers (buffer[0]-buffer [15]), each buffer 124 being configured to store ten milliseconds of audio data.

The audio mixer 116 is configured to receive play position data 126 from the audio hardware driver 113. The play position data 126 is used by the mix loop module 120 and the tracking module 122 to determine an exact memory position being played by the audio hardware 108. The exact memory position that is being played is used to determine which buffer is being played and to gauge the synchronization between the timing of the audio hardware 108 and the timing of the audio mixer 116.

Further discussion of the components and functions of FIG. 1 will be discussed in greater detail with respect to FIG. 2 and FIG. 3. In the following discussion, continuing reference will be made to the reference numerals shown in FIG. 1.

Exemplary Buffer Submission Module

Figure 2:
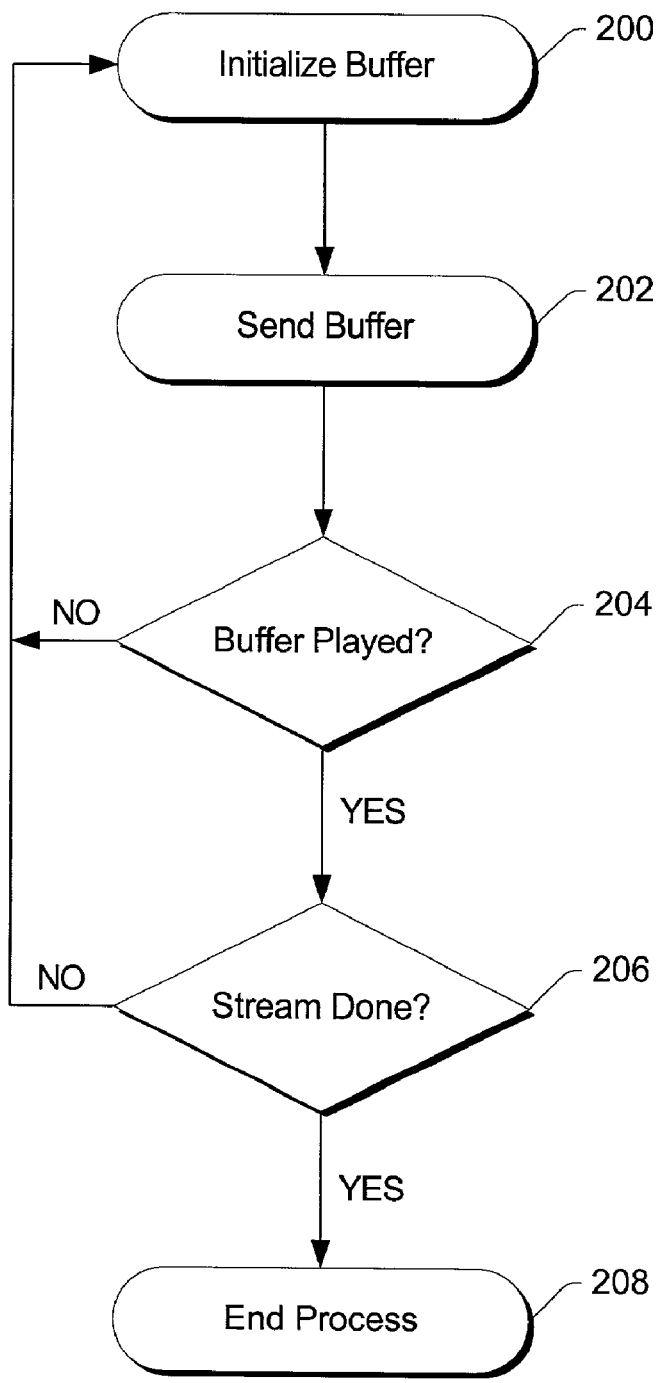
FIG. 2 is a flow diagram depicting a methodological implementation for running a non-realtime thread in an audio mixer.

FIG. 2 is a flow diagram depicting a methodological implementation for running a non-realtime thread (buffer submission module 118) in the audio mixer 116. The non-realtime thread submits blank, i.e., empty, buffers and sends it to the audio hardware driver 113. When a buffer has been played, it is cleared and sent again. This cycle keeps a constant feed of empty buffers queued at the audio hardware driver 113 for submission to the audio hardware 108.

At block 200, a buffer is initialized by setting all bits in the buffer to zero. The blank buffer is sent from the audio mixer 116 to the audio hardware driver 113 at block 202. As long as the submitted buffer has not been played ("No" branch, block 204), another buffer is initialized (block 200) and submitted to the audio hardware driver 113 (block 202).

When a buffer has been played ("Yes" branch, block 204), then if there is any more data in the audio stream to be played ("Yes" branch, block 206), buffers are initialized and sent to the audio hardware driver 113 (blocks 200, 202). The process ends (block 208) when the audio stream has concluded.

As previously discussed, each buffer may be configured to hold an amount of data that can be played in one pre-determined time period. In addition, there may be a pre-determined number of buffers used so that it is possible to determine which buffers have been played. In the described implementation, there are sixteen buffers (buffer[0] to buffer [15]) that each hold an amount of audio data that can be played in ten milliseconds.

The buffers are sent to the audio hardware driver 113 to reserve a time slot for the audio hardware 108 to play the audio data contained in the buffers. At the time the buffers are submitted, the buffers do not contain any audio data. As will be discussed in greater detail below, however, the empty buffers are filled with audio data prior to being played by the audio hardware 108. The buffers are filled according to a realtime schedule, i.e., by a real timer scheduler.

Exemplary Mix Loop Module

Figure 3:
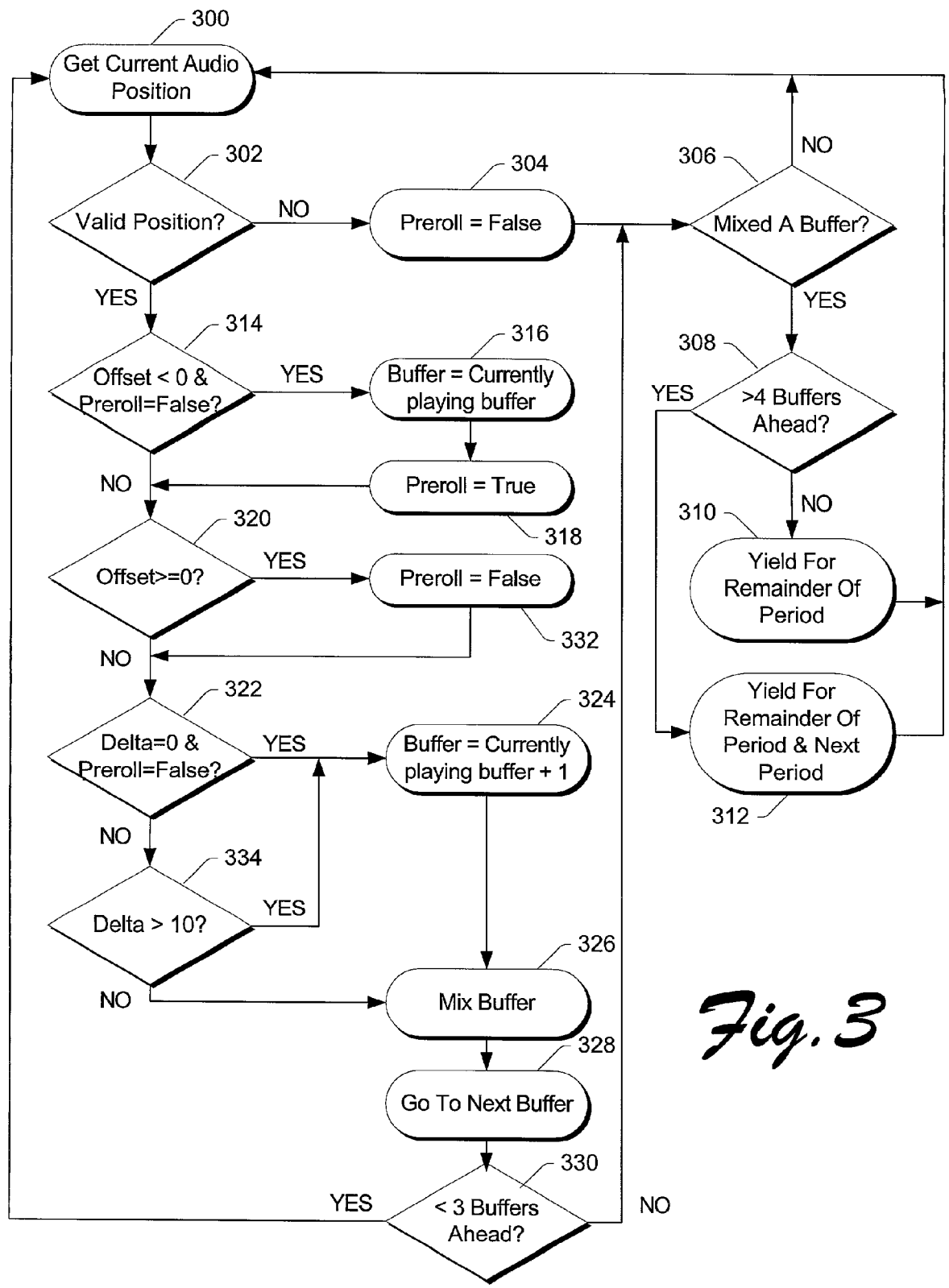
FIG. 3 is a flow diagram depicting a methodological implementation for running a realtime mix thread in an audio mixer.

FIG. 3 is a flow diagram depicting a methodological implementation for running a realtime mix loop thread (mix loop module 120) in the audio mixer 116 in accordance with an implementation of the present invention. In the implementation depicted by the flow diagram of FIG. 3, it is noted that the described system is configured to mix at least two buffers ahead of the buffer that the audio hardware 108 is currently playing, but not more than four buffers ahead. In other words, the mixing takes place two, three, or four buffers ahead of the playing. Given the present example, wherein each buffer contains ten milliseconds of audio data, this gives a latency of from twenty to forty milliseconds.

At block 300, the audio mixer 116 obtains a current audio position that indicates—by a hardware index and an offset—the buffer position and offset into the buffer that the audio hardware 108 is currently playing. If no valid position can be found ("No" branch, block 302), then a pre-roll flag is set to False (block 304). This ensures that the audio mixer index (the buffer being mixed into) will be resynchronized with the audio hardware index (the buffer being played) at the next available time.

After the pre-roll flag is set at block 304, if a buffer has not been mixed yet ("No" branch, block 306) then the process reverts back to block 300 and a current audio position is obtained. If a buffer has already been mixed ("Yes" branch, block 306), and the mixing (audio mixer 116) is outpacing the playing ("Yes" branch, block 308), then the mixing should yield for some period of time (block 312). Otherwise, soon the audio mixer 116 will have no more buffers to write to and—given sixteen buffers that can hold ten milliseconds of audio data each—one hundred and sixty milliseconds of latency will be experienced. This is probably unacceptable.

If the mixing buffer is less than four buffers ahead of the playing ("No" branch, block 308), then the audio mixer yields for a remainder of the time allotted to the thread (block 310). In the present example, the audio mixer is allotted ten milliseconds of time to mix buffers. If the mixing buffer is more than four buffers ahead of the playing ("Yes" branch, block 308), then the audio mixer yields for the remainder of the time allotted plus the following period (block 312). In this example, the audio mixer 116 would yield for the remainder of the current period plus ten milliseconds. After the yield period has been determined and executed, the process reverts to block 300 where a current audio position is obtained.

If a valid position is found ("Yes" branch, block 302), then it is determined at block 314 if the audio hardware is starting to pre-roll audio by playing silence prior to the first buffer. If so ("Yes" branch, block 314), then the audio mixer 116 and the audio hardware 108 are resynchronized to point to the same buffer (316). The pre-roll flag is then set at block 318. If pre-roll is not occurring ("No" branch, block 314), then no resynchronization is performed.

At block 320, it is determined whether to end any previous state of pre-rolling. If the offset into the playing buffer is non-negative ("Yes" branch, block 320), then the pre-roll flag is cleared (block 332).

At block 322, it is determined whether the audio mixer 116 is about to mix into a buffer that is currently playing. The delta, or difference, is measured as the number of buffers between the currently playing buffer and the next buffer to mix. If this number reaches zero while the pre-roll flag is false (block 322), the audio mixer 116 skips to the next buffer in the queue (block 324). This is not necessary if the mixing buffer is different from the playing buffer ("No" branch, block 322).

If delta is greater than ten (which could indicate that the audio mixer is more than ten buffers ahead or, more likely, six or more buffers behind)("Yes" branch, block 334), then the audio mixer 116 skips to the next buffer in the queue at block 324 to help catch up with the processing of the audio hardware 108. Otherwise ("No" branch, block 334), no adjustment is necessary.

The audio mixer 116 mixes the appropriate buffer at block 326. The audio mixer 116 is then incremented to look ahead to the next buffer to be mixed (block 328). A new difference between the buffer being played and the buffer being mixed (delta) is determined at block 330. If the audio mixer 116 is less than three buffers ahead—i.e., delta<3—("Yes" branch, block 330), then the process reverts to block 300 and repeats.

If the audio mixer 116 is three or more buffers ahead—i.e., delta>=3—("No" branch, block 330), then the audio mixer 116 is too far ahead of the audio hardware 108 and the process reverts to blocks 306 through 312, where the audio mixer 116 yields some time to allow the audio hardware 108 processing to catch up.

Exemplary Tracking Module

The tracking module 122 is configured to accurately determine an exact memory position where the audio hardware 108 is playing. With USB (Universal Serial Bus) Audio, this is provided in terms of a pointer to physical data in the playing buffer and an offset (in milliseconds) from the beginning of the buffer. A problem arises because, although the USB Audio virtual memory address returned points to the same physical memory address as the virtual memory address used by the audio mixer 116, the two virtual memory addresses are different. Therefore, it is impossible to determine which buffer is playing (by audio mixer index) from the USB Audio information.

To solve this problem, the present invention may be implemented so that each buffer begins on a memory page boundary so that the bottom twelve bits of the virtual memory addresses used by the audio mixer 116 and by USB Audio will be identical. This is assuming a thirty-two bit virtual address as used in the WINDOWS family of operating systems by MICROSOFT, wherein the first twenty bits of a virtual address refer to page tables and page directories, and the last twelve bits of the virtual address refer to an offset into the page. To do this, the buffers must be allocated (possibly over-allocated) such that using the bottom bits is not a problem. This requires over-allocating the buffers by up to two times a page size (2 times 4K, or 8K, in WINDOWS).

When writing to the first buffer (buffer[0]), the data is written into the buffer beginning at bit zero. This means that there is no offset into the memory page being used and, therefore the bottom twelve bits of the virtual address are 0000 0000 0000—or 0x000. When writing the next buffer (buffer[1]), the data is written beginning sixteen (16) bits into the memory page being used. As a result, the last twelve bits of the virtual address for buffer[1] are 0000 0001 0000—or 0x010. Likewise, when writing the next buffer (buffer[2]), the data is written beginning thirty-two (32) bits into the memory page being used. As a result, the last twelve bits of the virtual address for buffer[2] are 0000 0010 0000—or 0x020. Data to each successive buffer is stored beginning sixteen (16) bits over (to the right) from the bit where the data began in the previous buffer. As a result, each buffer as indicated below has a virtual memory address ending in the twelve bits shown below for each buffer:

| | |
|---|---|
| Buffer[0] = 0x000 | Buffer[8] = 0x080 |
| Buffer[1] = 0x010 | Buffer[9] = 0x090 |
| Buffer[2] = 0x020 | Buffer[10] = 0x0A0 |
| Buffer[3] = 0x030 | Buffer[11] = 0x0B0 |
| Buffer[4] = 0x040 | Buffer[12] = 0x0C0 |
| Buffer[5] = 0x050 | Buffer[13] = 0x0D0 |
| Buffer[6] = 0x060 | Buffer[14] = 0x0E0 |
| Buffer[7] = 0x070 | Buffer[15] = 0x0F0 |

Therefore, determining which buffer is pointed to by the pointer returned is simply a matter of looking at the last twelve bits of the virtual memory address and mapping the value found to the buffer configuration.

An additional step that may be taken when the buffers are configured in this way is to check that the least significant bit of the virtual memory address is always zero. If the least significant bit of the virtual memory address is not zero, then it means that the virtual memory address is incorrect and an error has occurred somewhere in the processing that determines wherein the audio hardware 108 is currently playing.

Exemplary Computer System

Figure 4:
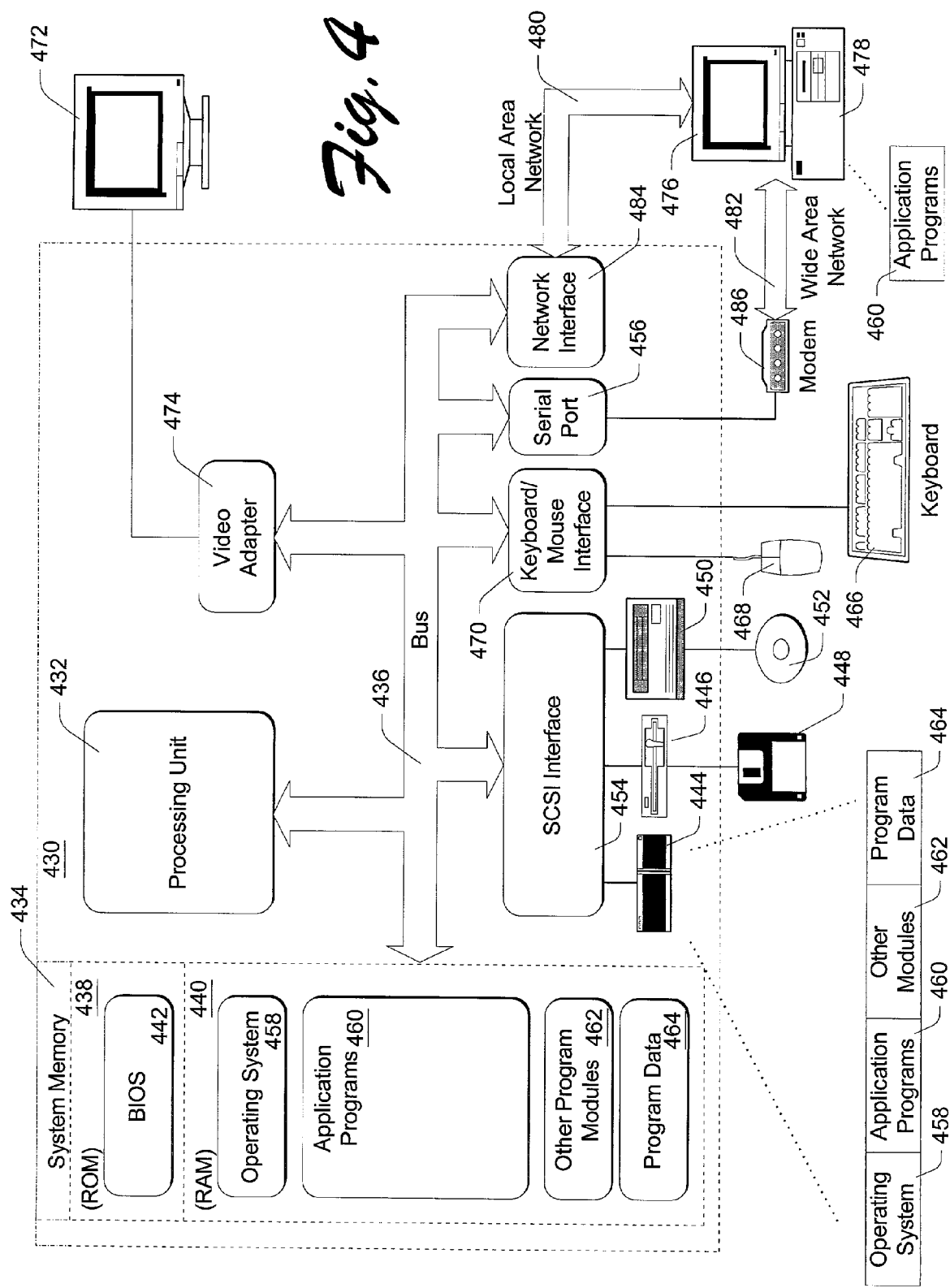
FIG. 4 is a diagram of an exemplary computer system that can be used to implement various aspects of various implementations of the invention.

FIG. 4 shows an exemplary computer system that can be used to implement various computing devices, i.e., client computers, servers and the like, in accordance with the described implementations and embodiments.

Computer 430 includes one or more processors or processing units 432, a system memory 434, and a bus 436 that couples various system components including the system memory 434 to processors 432. The bus 436 represents one or more of any of several types of bus structures, including a memory bus or memory controller, a peripheral bus, an accelerated graphics port, and a processor or local bus using any of a variety of bus architectures. The system memory 434 includes read only memory (ROM) 438 and random access memory (RAM) 440. A basic input/output system (BIOS) 442, containing the basic routines that help to transfer information between elements within computer 430, such as during start-up, is stored in ROM 438.

Computer 430 further includes a hard disk drive 444 for reading from and writing to a hard disk (not shown), a magnetic disk drive 446 for reading from and writing to a removable magnetic disk 448, and an optical disk drive 450 for reading from or writing to a removable optical disk 452 such as a CD ROM or other optical media. The hard disk drive 444, magnetic disk drive 446, and optical disk drive 450 are connected to the bus 436 by an SCSI interface 454 or some other appropriate interface. The drives and their associated computer-readable media provide nonvolatile storage of computer-readable instructions, data structures, program modules and other data for computer 430. Although the exemplary environment described herein employs a hard disk, a removable magnetic disk 448 and a removable optical disk 452, it should be appreciated by those skilled in the art that other types of computer-readable media which can store data that is accessible by a computer, such as magnetic cassettes, flash memory cards, digital video disks, random access memories (RAMs), read only memories (ROMs), and the like, may also be used in the exemplary operating environment.

A number of program modules may be stored on the hard disk 444, magnetic disk 448, optical disk 452, ROM 438, or RAM 440, including an operating system 458, one or more application programs 460, other program modules 462, and program data 464. A user may enter commands and information into computer 430 through input devices such as a keyboard 466 and a pointing device 468. Other input devices (not shown) may include a microphone, joystick, game pad, satellite dish, scanner, or the like. These and other input devices are connected to the processing unit 432 through an interface 470 that is coupled to the bus 436. A monitor 472 or other type of display device is also connected to the bus 436 via an interface, such as a video adapter 474. In addition to the monitor, personal computers typically include other peripheral output devices (not shown) such as speakers and printers.

Computer 430 commonly operates in a networked environment using logical connections to one or more remote computers, such as a remote computer 476. The remote computer 476 may be another personal computer, a server, a router, a network PC, a peer device or other common network node, and typically includes many or all of the elements described above relative to computer 430, although only a memory storage device 478 has been illustrated in FIG. 4. The logical connections depicted in FIG. 4 include a local area network (LAN) 480 and a wide area network (WAN) 482. Such networking environments are commonplace in offices, enterprise-wide computer networks, intranets, and the Internet.

When used in a LAN networking environment, computer 430 is connected to the local network 480 through a network interface or adapter 484. When used in a WAN networking environment, computer 430 typically includes a modem 486 or other means for establishing communications over the wide area network 482, such as the Internet. The modem 486, which may be internal or external, is connected to the bus 436 via a serial port interface 456. In a networked environment, program modules depicted relative to the personal computer 430, or portions thereof, may be stored in the remote memory storage device. It will be appreciated that the network connections shown are exemplary and other means of establishing a communications link between the computers may be used.

Generally, the data processors of computer 430 are programmed by means of instructions stored at different times in the various computer-readable storage media of the computer. Programs and operating systems are typically distributed, for example, on floppy disks or CD-ROMs. From there, they are installed or loaded into the secondary memory of a computer. At execution, they are loaded at least partially into the computer's primary electronic memory. The invention described herein includes these and other various types of computer-readable storage media when such media contain instructions or programs for implementing the steps described below in conjunction with a microprocessor or other data processor. The invention also includes the computer itself when programmed according to the methods and techniques described below.

For purposes of illustration, programs and other executable program components such as the operating system are illustrated herein as discrete blocks, although it is recognized that such programs and components reside at various times in different storage components of the computer, and are executed by the data processor(s) of the computer.

CONCLUSION

The above-described methods and systems provide a bridge between priority-based scheduling applications and a realtime scheduler. Existing applications utilizing a priority-based system can thereby be run on systems utilizing a realtime scheduler. The methods and systems also provide a way in which systems using different virtual memory addresses to address the same physical address can be manipulated to indicate a certain buffer that is being executed.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

The invention claimed is:

1. An audio mixer, comprising:
  a buffer submission module configured to create multiple buffers having no data and submit empty buffers to audio hardware in a buffer queue to reserve a time slot for the audio hardware to play data that will subsequently be processed into the empty buffers, the empty buffers being arranged serially in the buffer queue, wherein the audio hardware comprises a sound card and wherein before the sound card attempts to play an empty buffer that has been submitted to the sound card, the audio mixer fills the empty buffer with audio data received from one or more audio applications;
  a tracking module configured to identify a buffer that is currently being processed by the audio hardware, wherein the tracking module allows the audio mixer to know an exact memory location corresponding to audio data is being played for a given time;
  a mix loop module configured to receive one or more data inputs from the one or more audio applications and process the data inputs into a buffer after the buffer has been submitted without any audio data to the audio hardware but before the buffer is processed for playing the audio data by the audio hardware, wherein the mix loop module allows the audio mixer to determine when an empty buffer is just ahead of the audio hardware and mix into that buffer to provide a playable buffer having audio data that will be played, wherein the mix loop module is configured to mix a certain amount of buffers before the buffers are played by the audio hardware and to synchronize mixing with playing by the audio hardware such that if the buffers are mixed at a faster or slower rate than the audio hardware is playing the buffers, then the mix loop module compensates mixing so that the mixing and the playing remain in synchronization, wherein the mix loop module is configured to mix at least two buffers ahead of a buffer being played, but not more than four buffers ahead; and
  wherein the audio applications use one or more priority-based operating system threads to submit data to the mix loop module, and the audio data is processed and written to the buffers from within a realtime thread.

2. The audio mixer as recited in claim 1, wherein the buffer submission module is further configured to clear a buffer after the buffer has been processed by the audio hardware and to resubmit the cleared buffer in the buffer queue.

3. The audio mixer as recited in claim 1, wherein the audio hardware includes a audio hardware driver that processes data sent to and received by the audio hardware.

4. The audio mixer as recited in claim 1, wherein:
the buffer submission module is further configured to create the multiple buffers so that the start of each buffer is offset from a memory page boundary by a multiple of a fixed number of bytes; and
the tracking module is further configured to receive a play position from the audio hardware, the play position containing the starting memory address of the buffer currently being processed and the offset within the buffer to a current play location, and to identify a buffer that is currently being processed by the audio hardware by mapping the least significant bits of a starting memory address for a buffer to a buffer position in the buffer queue.

5. The audio mixer as recited in claim 4, wherein, the multiple of a fixed number of bytes is a power of 2.

6. The audio mixer as recited in claim 4, wherein:
the fixed number of bytes further comprises sixteen bytes; and the number of least significant bits of the memory address is twelve.

7. The audio mixer as recited in claim 4, wherein the offset from a memory page boundary further comprises sixteen times a zero-based ordinal position of the buffer in the buffer queue.

* * * * *